(12) United States Patent
Arnold et al.

(10) Patent No.: US 7,533,902 B2
(45) Date of Patent: May 19, 2009

(54) SEAT BELT PRETENSIONER USING PREFORMED TUBES

(75) Inventors: David R. Arnold, Macomb, MI (US); Richard A. Boelstler, Lake Orion, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 573 days.

(21) Appl. No.: 11/421,165

(22) Filed: May 31, 2006

(65) Prior Publication Data

US 2007/0278779 A1  Dec. 6, 2007

(51) Int. Cl.
*B60R 22/195* (2006.01)

(52) U.S. Cl. ........................ 280/806; 180/268; 297/480; 60/632

(58) Field of Classification Search ................. 280/805, 280/806; 180/268; 297/468, 470, 474, 480; 60/632, 635, 637, 638; *B60R 22/195*
See application file for complete search history.

(56) References Cited

U.S. PATENT DOCUMENTS

| | | | |
|---|---|---|---|
| 4,917,210 A | | 4/1990 | Danicek et al. |
| 5,310,219 A | * | 5/1994 | Fohl ............................ 280/806 |
| 5,310,220 A | * | 5/1994 | Fohl ............................ 280/806 |
| 5,411,291 A | * | 5/1995 | Fohl ............................ 280/806 |
| 5,450,723 A | * | 9/1995 | Fohl ............................. 60/638 |
| 5,519,997 A | * | 5/1996 | Specht ........................ 60/632 |
| 5,639,120 A | | 6/1997 | Kmiec et al. |
| 5,676,397 A | | 10/1997 | Bauer |
| 5,887,897 A | * | 3/1999 | Gill et al. ..................... 280/806 |
| 5,924,730 A | * | 7/1999 | Burrow et al. ............... 280/806 |
| 6,113,145 A | * | 9/2000 | Evans .......................... 280/806 |
| 6,213,513 B1 | * | 4/2001 | Grabowski et al. .......... 280/806 |
| 6,238,003 B1 | * | 5/2001 | Miller et al. ................. 297/480 |
| 6,264,281 B1 | * | 7/2001 | Dukatz et al. ............... 297/480 |
| 6,679,446 B2 | * | 1/2004 | Bell et al. .................... 242/374 |

(Continued)

FOREIGN PATENT DOCUMENTS

DE 102005041678 B3 * 11/2006

(Continued)

*Primary Examiner*—Ruth Ilan
*Assistant Examiner*—Barry Gooden, Jr.
(74) *Attorney, Agent, or Firm*—Markell Seitzman

(57) ABSTRACT

A pretensioner (20) for use with a seat belt system, the pretensioner comprising: a straight first tube (22) having a cylindrical wall (22a), a first end (24) and a second end (26), at least one of the first end (24) or the second end (26) having an opening (32); the first tube includes a first opening (38) in the wall (22a) to receive a second tube (50), the second tube (50) having a first end portion (52), a second end portion (56) and a medial portion (54), the medial portion configured to have a circular curvature of radius R1; the second end portion is situated so that its center is collinear with a central axis (64) extending through the center of the first tube (22) and wherein an axis extending through the center of the first end portion is arranged at an acute angle relative to the central axis (64); a pyrotechnic element (40) is provided at one end of the first tube to provide products of combustion to drive a piston (100) down the first tube, the motion of the piston moving a cable (80) in a direction to move a seat belt buckle to reduce belt slack about an occupant to be protected.

9 Claims, 7 Drawing Sheets

U.S. PATENT DOCUMENTS

| | | | |
|---|---|---|---|
| 6,840,544 B2 * | 1/2005 | Prentkowski | 280/806 |
| 6,866,296 B2 * | 3/2005 | Webber et al. | 280/806 |
| 7,172,218 B2 * | 2/2007 | Nakano et al. | 280/806 |
| 2003/0030264 A1 * | 2/2003 | Motozawa | 280/806 |
| 2003/0155801 A1 * | 8/2003 | Tatematsu et al. | 297/480 |
| 2003/0230661 A1 * | 12/2003 | Bell et al. | 242/374 |
| 2005/0151365 A1 * | 7/2005 | Nakayama et al. | 280/806 |
| 2005/0229726 A1 * | 10/2005 | Schubert et al. | 73/866.4 |
| 2006/0220369 A1 * | 10/2006 | Gray et al. | 280/806 |

FOREIGN PATENT DOCUMENTS

| | | |
|---|---|---|
| EP | 1371529 A2 * | 12/2003 |
| WO | 03/104050 A1 | 12/2003 |

* cited by examiner

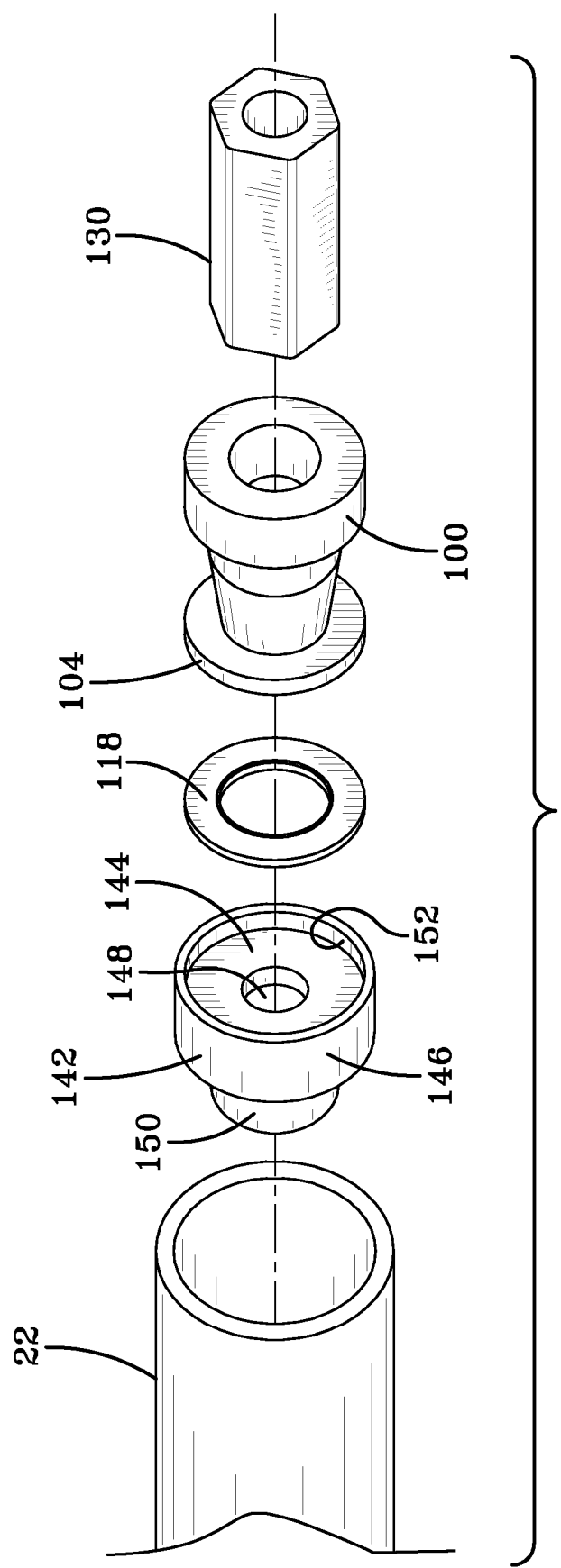

SEAT BELT PRETENSIONER USING PREFORMED TUBES

BACKGROUND AND SUMMARY OF THE INVENTION

The present invention generally relates to seat belt systems and more particularly to a pretensioner or belt tightener, which during an accident moves a seat belt buckle to a position that tends to tighten a lap belt and/or shoulder belt of a seat belt system (typically a 3-point seat belt system) about an occupant to be protected.

Pretensioners, which are often called belt tighteners, are known in the art and have been used in vehicles for many years. In general, a pyrotechnically driven piston is forced down a narrow tube at the onset of a vehicular accident. The piston is attached to an anchor cable, the other end of which is secured to the seat belt buckle. The buckle in turn is connected to a seat belt tongue, which is operatively attached to the lap belt and shoulder belt of, for example, a 3-point seat belt system. Quite often in buckle pretensioners, a portion of the cable is looped about a pulley or casting that provides a channel for the cable. This type of hardware supports the cable and also functions as a direction-changing element for adjacent sections of the cable. The hardware permits the piston to move down a tube that is oriented at an acute angle relative to an extending piece of cable connected to the buckle. Pretensioners will typically also include a housing element or bracket that is useful in mounting the pretensioner to, for example, a portion of the vehicle structure or seat structure. The housing element or bracket also includes an element that aids in positioning the cable/buckle portion of the cable assembly to meet buckle zone requirements as specified by NHTSA.

The present invention provides a lightweight, cost effective pretensioner that avoids the use of expensive castings.

It is an object of the present invention to provide a pretensioner having principle portions made from tubes.

It is a further object of the present invention to provide thermal resistance to the device during extreme temperatures as can occur during a fire, either during transportation of the device to the vehicle assembly plant or in the motor vehicle itself. This protection is accomplished by way of the steel tubing in contrast to traditional zinc die-cast components which, as used in the prior art, house a pyrotechnic device called a micro gas generator. The pyrotechnic device when subjected to extreme heat or a heat source, such as a flame, can begin to soften and melt prior to the auto-ignition of the propellant, causing molten metals to be projected from the device. The glass transition temperature of the steel tubing used in the present invention, which houses the gas generator, is several times higher than that of the zinc die-cast, reducing the potential of injury to either the occupant or the emergency personnel.

An additional aspect of this device is to provide staggered and measured energy management of the buckle head's (seat belt buckle) acceleration/deceleration at the end of pretensioning. Excessive acceleration has been demonstrated to damage internal components of the buckle head, requiring several countermeasures to be used to mitigate these effects. With the present invention the first deceleration feature is a ferrule that contacts the tapered section of the main tube, yielding the tubing, slightly absorbing energy. The second deceleration feature is a deformable bulb near the cable guide tube, which yields as a buckle connector contacts the end of the tube, providing additional energy absorption. The final deceleration feature in this sequence is the piston itself, which may also contact the tapered end of the main tube, preventing it from leaving the end and causing reduced performance in the retention of the buckle position.

A further object of this invention is to provide a more effective cable transition path. As can be seen in the prior art most current pretensioners include a pulley or cast, cable channel, which acts as a direction-changing element. The cable, when pulled about these devices, exhibits increased friction levels that affect pretensioner performance and reduce its efficiency. Further, the use of a hardened material to provide the cable path as opposed to a softer material, such as a zinc casting, is that the cable (which is for example a twisted wire rope) will no longer dig into the softer supporting material such as zinc. The cable path in the present invention is provided by a curved tube of sufficiently large diameter to overcome the deficiencies of the prior art.

Accordingly the invention comprises: a pretensioner for use with a seat belt system, the pretensioner comprising: a straight first tube having a cylindrical wall, a first end and a second end, at least one of the first end or the second end being open; the first tube includes a first opening in the wall to receive a second tube, the second tube having a first end portion, a second end portion and a medial portion, the medial portion configured to have a circular curvature of radius R1; the second end portion is situated so that its center is collinear with a central axis extending through the center of the first tube and wherein an axis extending through the center of the first end portion is arranged at an acute angle relative to the central axis; a pyrotechnic element is provided at one end of the first tube to provide products of combustion to drive a piston down the first tube, the motion of the piston moving a cable in a direction to move a seat belt buckle to reduce belt slack about an occupant to be protected, and a housing or bracket portion configured to attach the pretensioner to a mounting surface.

Many other objects and purposes of the invention will be clear from the following detailed description of the drawings.

BRIEF DESCRIPTION OF THE DRAWINGS

FIG. 6a is a projected view of some of the major components of the pretensioner.

DETAILED DESCRIPTION OF THE DRAWINGS

Figure 2:
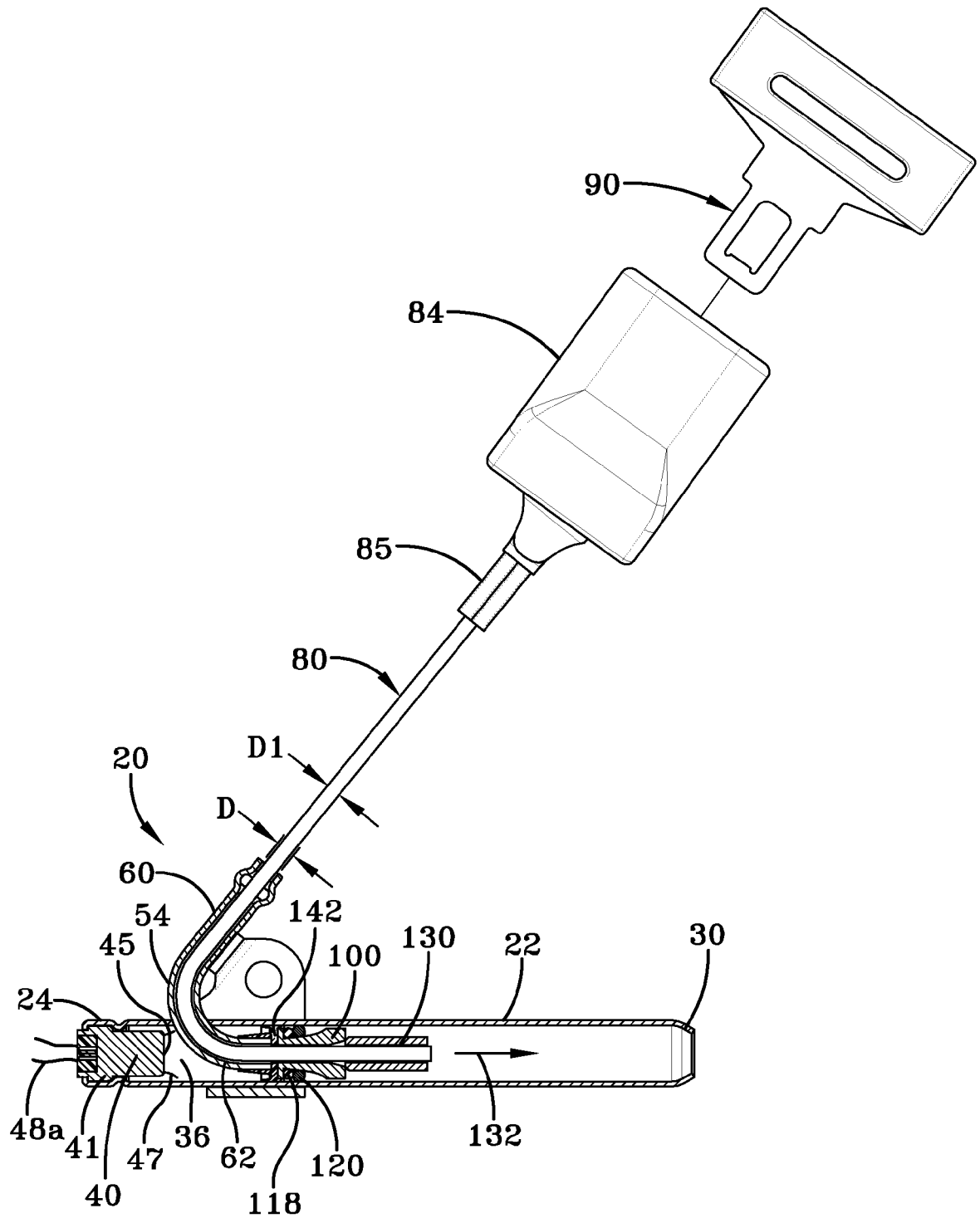
FIG. 2 is a cross-sectional view of the pretensioner in FIG. 1 showing some of the major components of the pretensioner.
Figure 3:
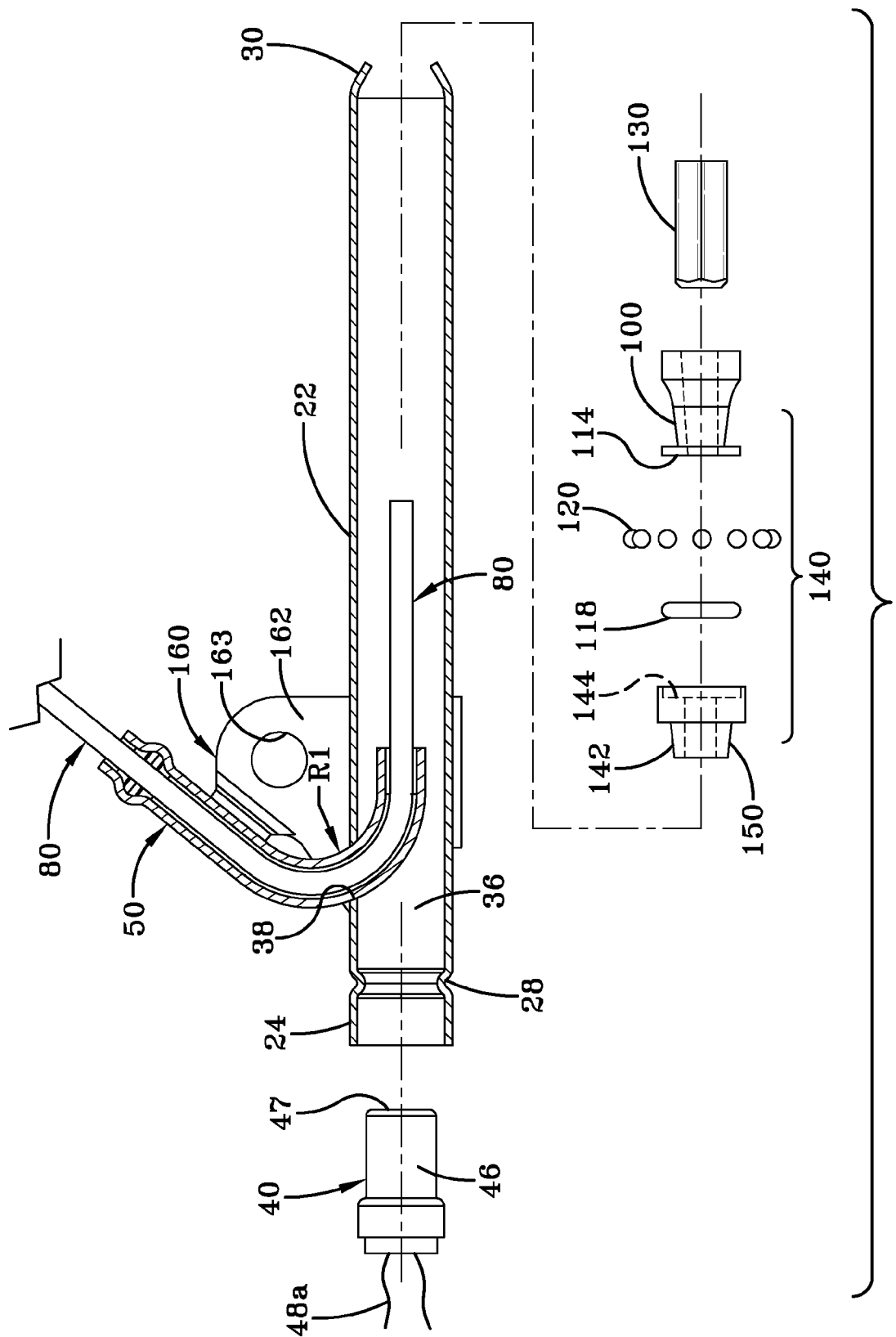
FIG. 3 is a partial exploded view of various components of a pretensioner constructed in accordance with the present invention.
Figure 4:
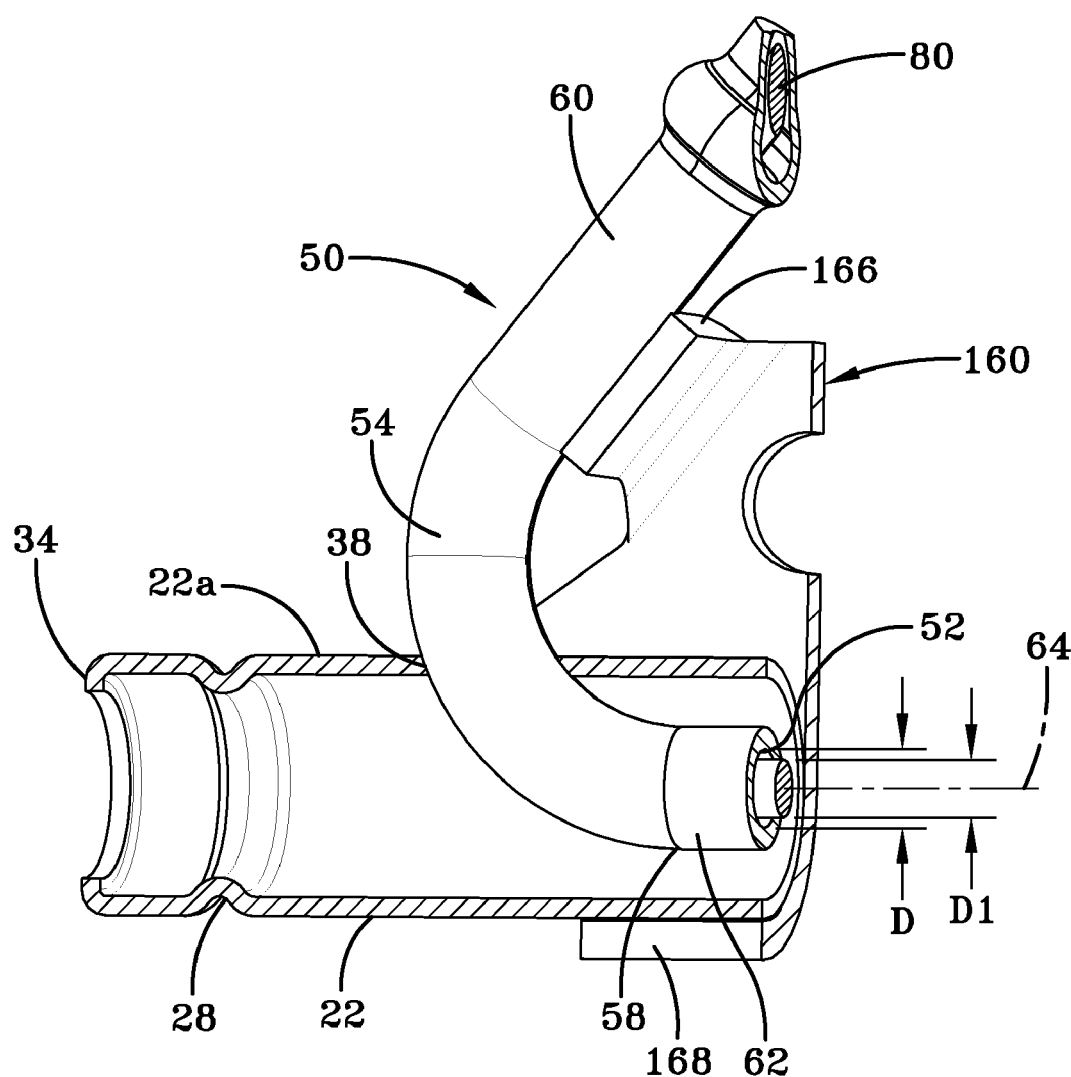
FIGS. 4 and 4a are partial cross-sectional views showing the interrelationship between various tubular elements of the pretensioner.

Reference is made to FIGS. 1-4, which illustrate the various features of a first embodiment of the present invention. Pretensioner 20 comprises an extruded steel tube 22, having a first end 24 and second end 26. Ends 24 and 26 are open. During the assembly process, a crimp 28 is made near end 24 to secure thereto a pyrotechnic element 40, and the tip of end 26 of tube 22 is rolled downwardly (see numeral 30) to reduce the diameter of the end opening 32 to be less than that of a ferrule 130. The pyrotecnic element 40 of known construction is inserted within end 24 of tube 22. A pyrotechnic element may include an enlarged head 41, which is restrained in position by the crimp 28 and by a rolled end 34 of tube 22, as shown in FIG. 4. The pyrotechnic element 40 (not shown in FIG. 4) is of known construction comprising a housing 46, filled with pyrotechnic material. The pyrotechnic element 40 may include one or more leads or wires 48a, which receive an excitation signal from a control unit. Upon exciting the pyrotechnic element, products of combustion produced downstream of the pyrotechnic element 40 exit open end (or opening) 45, which is located generally in the vicinity of region 36 of tube 22. Tube 22 further includes an oval-shaped opening 38 (see FIGS. 1 and 4) located on a top surface 22a. The open end 45 is closed by a foil 47 to protect the pyrotechnic material.

Pretensioner 20 includes a bent tube 50 having a diameter D of its inner wall 52 approximately 1.5 mm greater than the diameter D1 of a metal cable or wire rope 80, which extends through pipe 50. The difference in diameter permits the tube 50 to be bent and to receive a bent section of cable. Tube 50 includes a central segment generally identified by numeral 54, which in the illustrated embodiment is of a constant curvature. However, in general a constant curvature is not needed provided the tube (or pipe) has a smooth transition such as achieved using two or more curves tangent to one another. This central section 54 begins at region or point 56 and extends to point or region 58 of the tube 50. The tube includes an extending portion 60 that is oriented generally tangentially to the curved portion and provides a circular-to-straight transition region through which the cable 80 extends. The curved tube 50 includes another curved-to-straight transition segment 62.

Figure 4B:
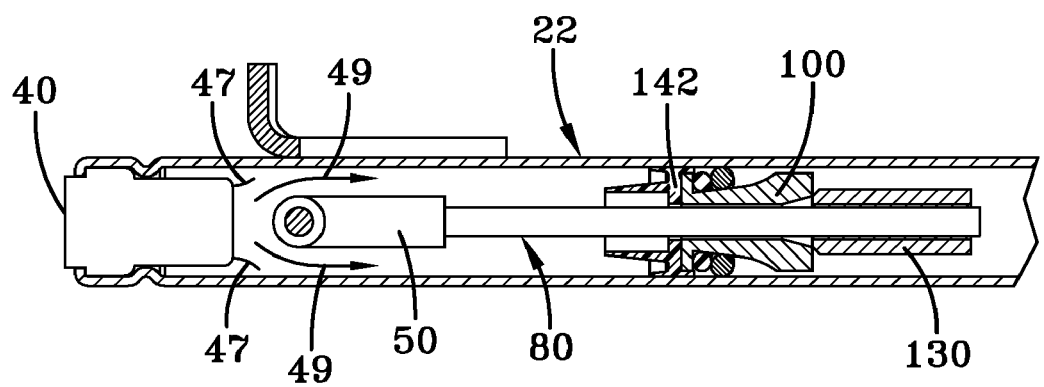
FIG. 4b shows gas flow about a tube.

During assembly, tube 50 is placed within opening 38 of the main tube 22. The tube 50 is manipulated such that the straight segment 62 is colinear to a central, longitudinal axis 64 of tube 22. In this configuration the center of portion 62 of tube 50 is colinear with the center of tube 22. This relationship can also be seen in FIGS. 4 and 4a. Further, as seen in FIG. 2 or 3, the tube 50 is spaced from the pyrotechnic element 40. A space between the gas generator and the cable guide tube allows the cruciform unrestricted movement to open, which should encourage linear flow about the lower portions of tube 50 (as shown by arrows 49 in FIG. 4b) as the products of combustion flow about the tube. It should be noted that in FIGS. 4 and 4a the piston, cable ferrule and cable have been eliminated to more clearly illustrate the orientation of tube 50 within tube 22.

Figure 4A:
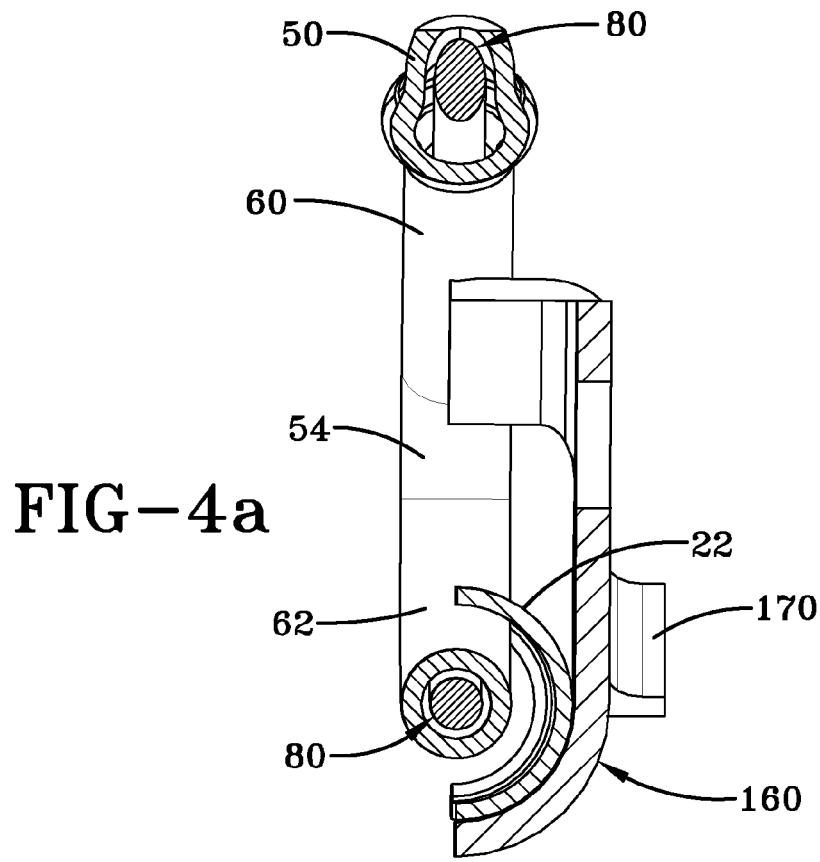

As can be seen from FIG. 4a, sections 54 and 60 of tube 50 are oriented generally perpendicularly to the top surface 22a of tube 22.

Figure 1:
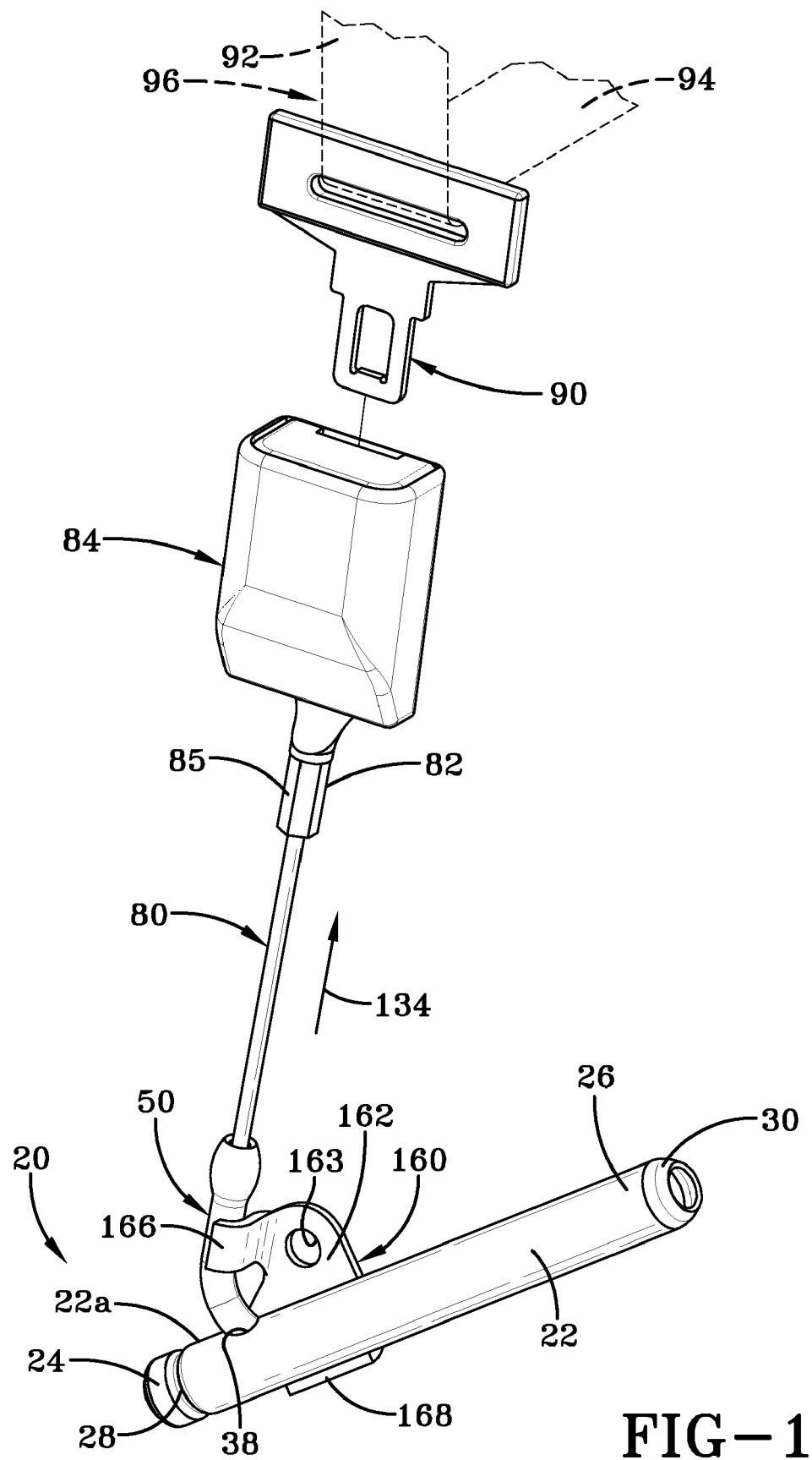
FIG. 1 is an isometric view of a seat belt pretensioner in accordance with the present invention.

During assembly, cable 80 is threaded through tube 50; one end 82 of cable 80 is connected directly to a seat belt buckle 84 of the type used in pretensioner operation or indirectly through another ferrule 85 that has a plate portion connectable to the buckle 84. FIG. 1 schematically illustrates a seat belt tongue 90 about to be secured in a locking relation with buckle 84. Also schematically illustrated is a portion of shoulder belt 92 and lap belt 94 of a seat belt system 96, which are secured or connected to tongue 90 in one of the many ways known in the art. Cable 80 includes an opposite end 86 movable to a piston 100. Piston 100 is slidably received about end 86 of the cable. A cable terminating element such as ferrule 130 is slipped about end 86 of cable 80 and crimped, thereby providing a mechanical connection between ferrule 130 and cable end 86.

Figure 5:
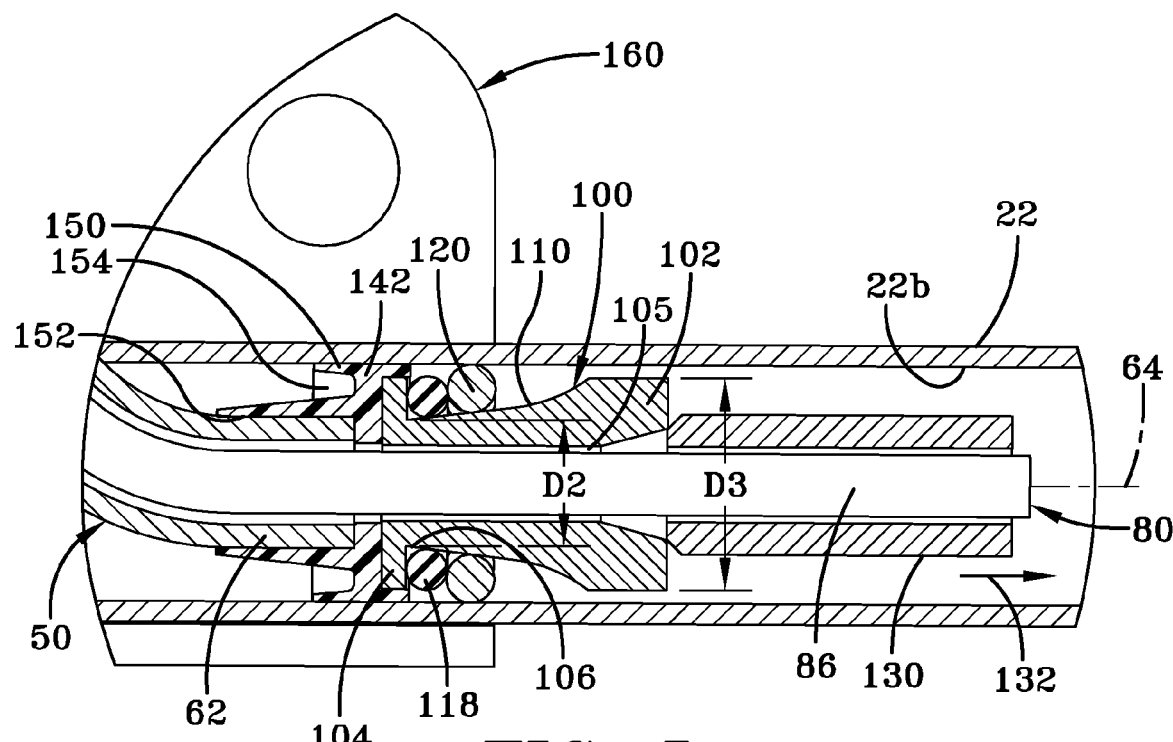
FIG. 5 is a cross-sectional view showing an enlarged view of a portion of the pretensioner.
Figure 6:
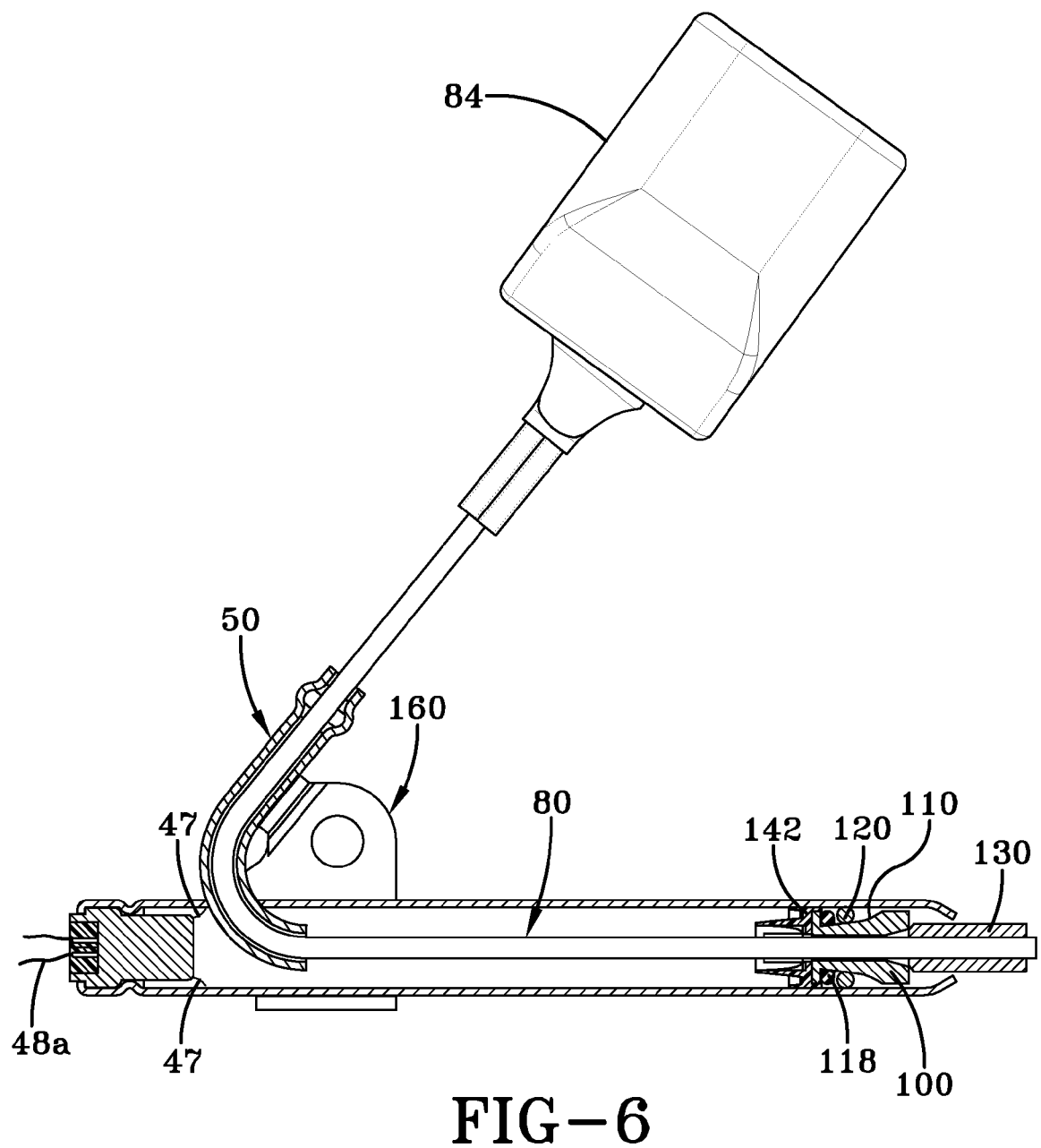
FIG. 6 shows the pretensioner in an activated condition.

Piston 100 includes a forward cylindrically shaped portion 102 and a rearward cylindrically shaped portion 104 as shown in FIG. 5. Portions 102 and 104 slidably engage inner wall 22b of tube 22, maintaining the alignment of piston 100 to axis 64 as the piston moves within the tube. The piston 100 includes a central bore 105 to slidingly receive the cable 80. Cylindrical portions 102 and 104 form a V-shaped groove, recess or restriction 106. A resilient member 118, such as a rubber O-ring or spongy material is received within groove 106 and resiliently supports a plurality of ball bearings 120. Piston 100 further includes a funnel-shaped surface 110, which transitions from a narrow diameter region D2 to a larger diameter region D3 (diameter D3 approaches the size of the inner diameter of tube 22).

Located between the piston 100 and the end of segment 62 of tube 50 is a movable, flexible seal 142 typically made of an elastomer with a high temperature resistance or rating. The seal 142 seals the tubes in a manner similar to a wad or sabot used in firearms. The piston 100 and seal 142 can be considered as comprising a piston assembly 140 as the end 104 fits into a recess 144 of the seal 142, and the seal 142 and the piston 100 move together. Seal 142 also includes a body 146 having a center bore 148. The top of the body includes a lip that forms the recess 144. The opposite end of the body is configured as two sliding or lip seals, a first sealing against the inner diameter of tube 22 and the second sealing against the outer diameter of tube 50, more particularly tube segment 62. The opposite end of the body 146 includes a tapered outer, flexible cylindrical wall 150. Wall 150 tapers outwardly so that its thinnest portion is at the end of wall 150. The opposite end of the body 146 includes a flexible, cylindrical inner wall 152, concentric to wall 150. Wall 152 tapers inwardly so that its thinnest portion is at the end of wall 152. The inner diameter of wall 152 forms a fluid-tight seal about portion 62 of tube 50. The two walls 150 and 152 form a tapered cylindrical cavity 154. During assembly the seal 142 is placed about the end of segment 62 of tube 50, with end 104 of the piston 100 received within the recess 144.

FIGS. 2 and 5 show the positioning of the various parts of pretensioner 20 prior to activation. In this configuration, end surface 114 of piston 100 is received in recess 144. The sealing member 142 is positioned adjacent and about end 62 of tube 50. Further, each of the ball bearings 120 is loosely received within the tube and about the narrow diameter portion 112 of the piston and adjacent O-ring 118.

During activation of the pyrotechnic element 40, products of combustion are produced, which enter region 36 of tube 22. Thereafter these products of combustion flow down the tube 22 and along the exterior wall of tube 50 and around portion 62 of tube 50, as well as about the lower part of portion 54 of tube 50. The products of combustion are received in the tapered cylindrical cavity 154 and push lip seal or wall 150 against the inner diameter of tube 22 forming a seal therebetween and urge lip seal or wall 152 against the outer diameter of tube 50 forming another seal therebetween. The products of combustion, which include gas at an elevated pressure, urge sealing member 142, piston 100, O-ring 118 and balls 120 rapidly down tube 22 in the direction of arrow 132. The moving piston pushes against ferrule 130 causing the ferrule, as well as cable end 86, to rapidly move down tube 22. Movement of end 86 of the cable causes cable 80 to be drawn through tube 50, thereby moving the seat belt buckle 84 in the direction of arrow 132, which as mentioned above will tend to remove slack and tighten the seat belt system about the occupant. While the seal 142 remains in engagement with tube 50 it will prevent gas leakage through tube 50. The seal 142 will disengage from tube 50 as the activation event progresses.

The seal 142, piston 100 (O-ring 118 and balls 120) and ferrule 130, in response to the produced products of combustion, are repositioned by about 100 mm closer to the end 26 of tube 22 in a matter of about 10 milliseconds after excitation of the pyrotechnic element 40.

In the preferred embodiment of the invention the diameter of the piston is greater than the reduced diameter of end 30 of tube 22 and the diameter of the ferrule 130 may be greater than that of the end 30 of tube 22. If the ferrule impacts end 30 of tube 22 it will outwardly deform the tube. This interaction impact slows the movement of the cable 80 (as well as buckle 84 and other parts connected to the cable) as energy is transferred to deforming the tube 22. Further, if there is a large amount of the slack in the seat belt system it is possible that piston 100 will continue to move and contact the end 30 of the tube (which may have been somewhat enlarged if it was contacted by the ferrule). In this manner more energy is absorbed tending to also decelerate the movement of the piston and ferrule and cable.

As the accident proceeds, the occupant, protected by the seat belt system and pretensioner, will tend to move forwardly, loading the shoulder belt 92 and lap belt 94. This loading will tend to pull the buckle 84 and cable 80 in a direction shown by arrow 134, which is generally opposite to the direction of arrow 132; if unchecked the forces applied to the cable by the occupant could pull the piston toward its start position and reintroduce slack. To prevent the cable from moving and thereby reintroducing slack about the occupant, the piston is configured with a one-way clutch in the form of surface 110 and the spherical members 120. Such clutches have been used in the prior art. As the buckle moves outwardly toward its original position, the relative position of the ball bearings 120 changes in that the ball bearings roll up the ramped surface 110 and become trapped between surface 110 and the inner diameter or wall 22b of tube 22 to provide a mechanical lock against the piston 100. As is known in the art, the design of this type of one-way clutch can be configured to hold the piston in place during and in response to crash forces generated during an accident, or alternatively, permit the piston to controllably move in a direction opposite to arrow 132, thereby controllably managing the crash forces produced during an accident.

The pretensioner 20 further includes a mounting member 160 such as a housing or bracket, which serves to mount the pretensioner to a vehicle or seat structure. Mounting member 160 includes a plate portion 162 having a mounting hole 163 therein for receipt of a mounting fastener (not shown) to fasten the member 160 to the vehicle or seat. The plate portion 162 includes a top and lower curved portions or tabs 166 and 168, which are respectively secured such as by welding or brazing to the tubes 50 and 22. The tabs 166 and 168 prevent movement of the narrow tube 50. The plate portion 162 includes another tab 170 that is bent oppositely from tabs 166 and 168. Tab 170 extends outwardly from plate portion 162 and provides a locating tab to properly align the pretensioner 20 to the mounting surface.

Many changes and modifications in the above-described embodiment of the invention can, of course, be carried out without departing from the scope thereof. Accordingly, that scope is intended to be limited only by the scope of the appended claims.

The invention claimed is:

1. A pretensioner (20) for use with a seat belt system,
the pretensioner comprising: a first tube (22) having a cylindrical wall (22a), a first end (24) and a second end (26), at least one of the first end or the second end being open (32),
the first tube includes a first opening (38) in the wall (22a) to receive a second tube (50), the second tube (50) having a first end portion (60);
a second end portion (62) and a medial portion (54), the medial portion configured to have a circular curvature of radius R1; the second end portion is situated so that its center is collinear with a central axis (64) extending through the center of the first tube (22) and
wherein an axis extending through the center of the first end portion is arranged at an acute angle relative to the central axis (64); a pyrotechnic element (40) is provided at one end of the first tube to provide products of combustion to drive a piston (100) down the first tube, the motion of the piston moving a cable (80) in a direction to move a seat belt buckle (84) to reduce belt slack about an occupant to be protected.

2. The pretensioner according to claim 1 wherein the first tube is straight.

3. The pretensioner according to claim 1 wherein the diameter of the second tube proximate the second end portion is smaller than the inner diameter of the first tube.

4. The pretensioner according to claim 3 wherein the first tube is straight and wherein the pyrotechnic element (40) is received in the second end (26) of the first tube.

5. The pretensioner according to claim 4 wherein the pyrotechnic element (40) includes an exit opening (45) centrally disposed within the first tube (22) and wherein the exit opening is located adjacent to and upstream of the second end portion of the second tube.

6. The pretensioner according to claim 1 including the piston (100) which is configured to be driven down the first tube in response to products of combustion generated by the pyrotechnic element and wherein the wire cable (80) is received through the second tube and connected to the seat belt at one end and operably connected to the piston at a second end (86) of the cable.

7. The pretensioner according to claim 6 including a ferrule (130) linked to the second end (86) of the cable, the ferrule moved by the piston.

8. The pretensioner according to claim 6 including a one-way clutch mechanism configured to enable the piston to be urged down the first tube and configured to prevent or resist motion in an opposite direction.

9. The pretensioner according to claim 1 wherein prior to activation of the pyrotechnic element (40) the piston (100) is located in an abutting relation with the end of the second end portion of the second tube.

* * * * *